United States Patent [19]

Grossi et al.

[11] 4,384,075

[45] May 17, 1983

[54] CATIONIC ALKENYL AZABENZENE AND RUBBER MODIFIED ASPHALTS

[75] Inventors: Anthony V. Grossi, Newark; Leon A. Hagelee, Minerva Park; Louis T. Hahn; Alfred Marzocchi, both of Newark, all of Ohio

[73] Assignee: Owens-Corning Fiberglas Corporation, Toledo, Ohio

[21] Appl. No.: 329,904

[22] Filed: Dec. 11, 1981

[51] Int. Cl.$^3$ .................. C08F 289/00; C08G 83/00; C08H 5/00
[52] U.S. Cl. .................................... 525/54.5; 527/500
[58] Field of Search ........................ 527/500; 524/71; 525/54.5; 106/273 N

[56] References Cited

U.S. PATENT DOCUMENTS

| | | | |
|---|---|---|---|
| 2,888,407 | 5/1959 | Cooper et al. | 521/83 |
| 3,096,190 | 7/1963 | De Groote et al. | 106/273 N |
| 3,097,179 | 7/1963 | Ceintrey | 524/61 |
| 3,259,512 | 7/1966 | Dickson et al. | 106/273 R |
| 3,303,151 | 2/1967 | Peters et al. | 252/47.5 |
| 3,547,850 | 12/1970 | Montgomery | 524/705 |
| 3,997,354 | 12/1971 | Pivette et al. | 106/273 N |
| 4,166,752 | 9/1979 | Marzocchi et al. | 106/273 N |
| 4,273,685 | 6/1981 | Marzocchi et al. | 260/28.509 |
| 4,316,829 | 2/1982 | Roberts | 106/273 N |

*Primary Examiner*—Theodore Morris
*Attorney, Agent, or Firm*—Ronald C. Hudgens; Robert F. Rywalski

[57] ABSTRACT

Cationic chemically modified asphalts having utility for road construction, repair and maintenance as well as coating for various substrates, including cementitious substrates, glass and metal are provided. These asphalts are the product produced by reacting an alkenyl azabenzene, asphalt, a vinyl aromatic monomer and a rubbery polymer.

13 Claims, No Drawings

CATIONIC ALKENYL AZABENZENE AND RUBBER MODIFIED ASPHALTS

CROSS-REFERENCES

This case is related to U.S. Ser. No. 329,898 filed concurrently herewith.

TECHNICAL FIELD

The present invention relates to asphalt compositions, and more particularly it relates to chemically modified asphalt compositions. Even yet more particularly, the present invention relates to cationic cationic alkenyl azabenzene modified asphalts.

BACKGROUND, SUMMARY AND INDUSTRIAL EXPLOITATION

Asphalt has been employed for numerous and wide variety of applications for many years. One of the problems encountered with asphalt is that its adhesion to various substrates and especially to aggregate needs to be improved. Such aggregate is represented, for example, by gravel, crushed rock, slag, sand and crushed limestone. Additionally, the adhesion of asphalt needs to be improved with respect to other material such as, for example, cementitious materials, metals, glass and the like.

An improved chemical composition is provided in accordance with this invention, which composition is the product produced by reacting an alkenyl azabenzene with asphalt, and a vinyl aromatic monomer and a rubbery polymer.

Chemically modified asphalts which are produced by reacting asphalt, a vinyl aromatic monomer and a rubber polymer are disclosed in U.S. Pat. No. 4,273,685. While vinyl pyridine and styrene are listed, this patent does not suggest the present invention.

Some of the desirable properties of the present compositions include improved coatability of negatively charged surfaces, improved adhesion, less stripping, improved emulsifiability, improved flexibility, particularly at low temperatures, improved strength, reduced high temperature flow, increased durability, better compatibility.

These compositions will find utility for a wide variety of purposes. They, for example, will find application in the highway and bridge construction, repair and maintenance areas as, for example, crack and pothole fillers, joint sealers, and water resistant membranes, as well as cut-backs with the compositions being used alone or as blends with conventional asphalts. These compositions can be formed into emulsions with conventional asphalt emulsifiers to form a slow set emulsion, having utility for slurry seal applications, or as a cold overlay. Preferably non-ionic surfactants are used as emulsifiers. The compositions may also be employed as corrosion resistant and/or water resistant coatings for metals and as coatings and/or impregnants for glass, especially glass fibers. Such coated or impregnated glass fibers will show outstanding capability with conventional asphalt and consequently will serve as outstanding reinforcements for such asphalts.

DESCRIPTION

The compositions of the present invention are obtained by heating at an elevated temperature for several hours. Suitably, the reacting is done by heating at a temperature of at least about 120° C. for about 10 hours, and most desirably, at a temperature of about 160° C. to about 180° C. for about 20 hours.

Representative of suitable alkenyl azabenzenes are the alkenyl pyridine compounds of the formula

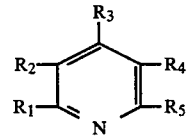

wherein $R_1$, $R_2$, $R_3$, $R_4$, and $R_5$ are independently selected from the group consisting of hydrogen, a $C_1$–$C_3$ alkyl, a $C_1$–$C_3$ alkoxy, halogen, cyano, nitro, amino with at least one of said $R_1$, $R_2$, $R_3$, $R_4$ or $R_5$ groups being an alkenyl group containing 2–5 carbon atoms. Representative of such alkenyl groups are 1 propenyl, 1 butenyl and 1 pentenyl. Preferably the alkenyl group is ethenyl. Preferred compounds are 2 vinyl pyridine and 4 vinyl pyridine.

The above-type alkenyl azabenzenes contain a double bond and it will be found that the presence of this double bond provides for the ability to chemically incorporate it into the composition by reaction with the double bond unsaturation of the asphalt. Additionally, the nitrogen present in the alkenyl azabenzenes provide for highly desirable polarity which serves to greatly enhance the adhesive bonding of the present compositions to various substrates, including, for example, aggregates commonly employed in road repair and maintenance, as well as cementitious and other substrates.

Asphalt materials which are suitable for these purposes preferably include those which are typically used for road paving, repair and maintenance purposes. Thus, asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Additionally, the asphalts can be those that have been blown with steam, ammonia, or amines of the type set forth in U.S. Pat. No. 4,166,752. Preferably, the asphalt which will be employed is an asphalt cement of the type typically used for road paving, repair and maintenance purposes, such as for example, the AC-5, AC-10, AC-20 grades. Such asphalts typically have penetrations ranging between about 20 to about 200.

As the polymerizable vinyl monomer, use is preferably made of a monofunctional vinyl aromatic monomer having a general formula:

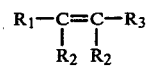

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

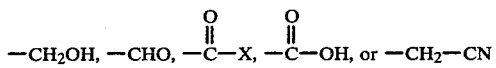

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula:

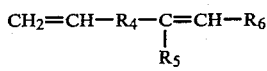

wherein $R_4$ is a divalent aromatic group containing 6 to 12 carbon atoms, and preferably a phenylene group; and, $R_5$ and $R_6$ having the same meaning as is described above with respect to $R_2$ and $R_3$, respectively for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of vulcanizable elastomeric materials well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

The amount of the various ingredients may vary over a wide range. Preferably, however, the alkenyl azabenzene will be employed in an amount of about 0.5 to about 15% based on the weight of asphalt, the vinyl aromatic will be used in an amount of about 0.5 to about 35% based on the weight of the asphalt, and the rubbery polymer will be employed in an amount of about 0.5 to about 30% based on the amount by weight of asphalt.

While the above describes the invention with sufficient particularity to enable those skilled in the art to make and use same, nonetheless further examplification follows.

EXAMPLE

Using a charge of about 71.5% of AC-20 asphalt, 3% by weight of 4 vinyl pyridine, about 13% by weight of styrene, and about 12.5% by weight of Solprene 1205C rubber, a composition is produced as follows. Into a reactor equipped with an agitator and a reflux condenser, the asphalt is charged and heated to approximately 110° C. at which time styrene is charged into the reactor. The reactor is then heated to a temperature of about 160° C. during which time the vinyl pyridine and the rubber is charged into the reactor. The ingredients are then heated at a temperature of about 160° C. with agitation and under reflux for about 20-24 hours. This product when cooled is suitable for any of the varied utilities previously set forth.

While the above describes the present invention, it will, of course, be apparent that modifications are possible which pursuant to the patent statutes and laws do not depart from the spirit and scope thereof.

We claim:

1. As a composition of matter, the product produced by reacting a mixture consisting essentially of an alkenyl azabenzene, asphalt, a vinyl aromatic monomer of the formula $R_1-C(R_2)=C(R_2)-R_3$, wherein $R_1$ is an aromatic group containing six to twelve carbon atoms, $R_2$ is hydrogen or a $C_1$ to $C_5$ alkyl and $R_3$ is hydrogen, a $C_1$ to $C_5$ alkyl or a radical selected from the group consisting of $-CH_2OH$, $-CHO$, $-C(O)-X$, $-COOH$, and $-CH_2-CN$ wherein X is halogen, and optionally, a polyfunctional monomer of the formula $CH_2=CH-R_4-C(R_5)=CH-R_6$ wherein $R_4$ is a divalent aromatic group containing six to twelve carbon atoms, and $R_5$ and $R_6$ have the same meaning as described above with respect to $R_2$ and $R_3$, and a rubbery polymer.

2. The composition of claim 1 wherein said alkenyl azabenzene is a compound of the formula

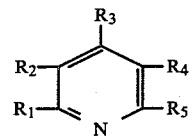

wherein $R_1$, $R_2$, $R_3$, $R_4$ and $R_5$ are independently selected from the group consisting of hydrogen, a $C_1$-$C_3$ alkyl, a $C_1$-$C_3$ alkoxy, halogen, cyano, nitro, and amino with at least one of $R_1$, $R_2$, $R_3$, $R_4$, $R_5$ being an alkenyl group containing 2-5 carbon atoms.

3. The composition of claim 2 wherein said alkenyl group is ethenyl.

4. The composition of claim 3 wherein $R_1$ is said alkenyl.

5. The composition of claim 3 wherein $R_3$ is said alkenyl.

6. The composition of claim 4 or claim 5 wherein the remaining R groups are hydrogen.

7. The composition of claim 1 wherein said rubbery polymer is a diene homopolymer or a copolymer of a diene and an ethylenic monomer.

8. The composition of claim 7 wherein said rubber is a styrene-butadiene copolymer and said vinyl aromatic is styrene.

9. The composition of claim 2 wherein said reacting is done by heating at a temperature of at least about 120° C. for at least about 10 hours.

10. As a composition of matter, the product produced by reacting at an elevated temperature for several hours a mixture consisting essentially of an alkenyl azabenzene, asphalt, a vinyl aromatic monomer of the formula $R_1-C(R_2)=C(R_2)-R_3$, wherein $R_1$ is an aromatic group containing six to twelve carbon atoms, $R_2$ is hydrogen or a $C_1$ to $C_5$ alkyl and $R_3$ is hydrogen, a $C_1$ to $C_5$ alkyl or a radical selected from the group consisting of $-CH_2OH$, $-CHO$, $-C(O)-X$, $-COOH$, and $-CH_2-CN$ wherein X is halogen, and optionally, a polyfunctional monomer of the formula $CH_2=CH-R_4-C(R_5)=CHOR_6$ wherein $R_4$ is a divalent aromatic group containing six to twelve carbon atoms, and $R_5$ and $R_6$ have the same meaning as described above with respect to $R_2$ and $R_3$, and a rubbery polymer.

11. The composition of claim 10 wherein said reacting is done by heating at a temperature of at least about 120° C. for at least about ten hours.

12. The composition of claim 11 wherein said heating is done at a temperature of about 160° C. to about 180° C.

13. The composition of claim 10 wherein said vinyl aromatic monomer is styrene and wherein said rubbery polymer is a diene homopolymer or a copolymer of a diene an an ethylenic monomer.

* * * * *